Nov. 8, 1938.   F. WERNER   2,135,777
APPARATUS FOR FEEDING ROD SHAPED BODIES
Filed June 4, 1937
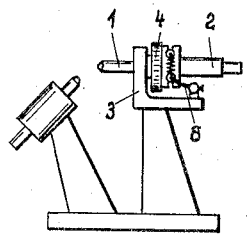
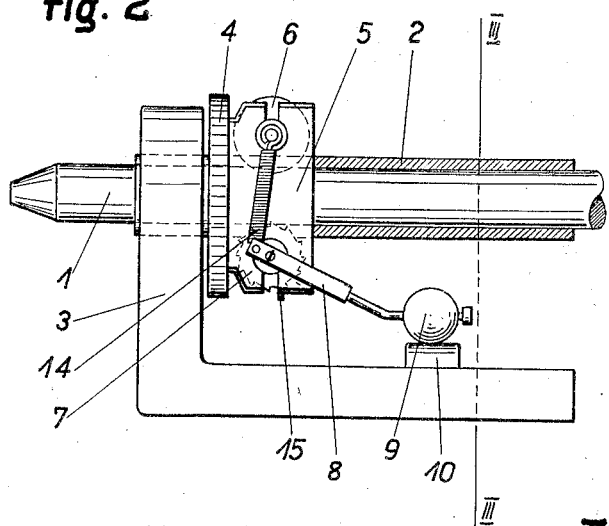
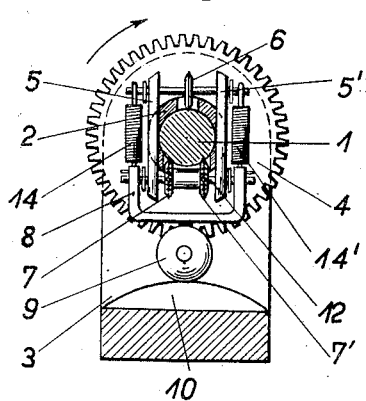
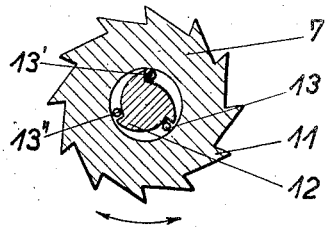
Inventor: Felix Werner
Attorney.

Patented Nov. 8, 1938

2,135,777

UNITED STATES PATENT OFFICE 2,135,777

APPARATUS FOR FEEDING ROD SHAPED BODIES

Felix Werner, Leipzig, Germany, assignor to the firm Körting & Mathiesen Aktiengesellschaft, Leipzig-Leutzsch, Germany Application June 4, 1937, Serial No. 146,511
In Germany June 6, 1936

4 Claims. (Cl. 176—70)

My invention relates to an apparatus for feeding—i. e. advancing—rod-shaped bodies, step by step. A principal object of my invention is to provide an improved carbon feed for electric arc lamps having rod-shaped electrodes, as commonly used in search lights and projecting apparatus. The feed of one of the rod-shaped electrodes is obtained by revolving toothed wheels engaging the electrode for feeding the same.

My invention relates more particularly to the form of such feeding wheels. According to this invention, the teeth of the wheels feeding the rod-shaped body are preferably made like the teeth of a milling cutter. The leading surface of each tooth is approximately radial to the axis of the wheel, that is, the elements of the leading surface lie in planes that are substantially radial with respect to the axis of the wheel. The following surface of each tooth should be approximately tangential to a circle concentric to said axis and of less diameter than the wheel, i. e., the following face intersects the leading face at an angle to form a tooth having a pointed profile.

Such toothed wheels, in an apparatus for feeding or advancing, step-by-step, rod-shaped bodies, have the advantage of engaging the body to be fed at a smaller angle than wheels which are formed with symmetrical blunt teeth. Consequently, the teeth formed with faces as herein described bite or penetrate into the rod-shaped body, without consuming excessive power, and accomplish the desired feed of the body in a reliable manner.

Another object of the invention is to simplify the revolving mechanism for the rotation of the fed rod-shaped body round his axis.

A further object of the invention is to simplify the gearing mechanism by coupling the toothed-wheels with the supporting trunnion in one direction of the rotation and releasing the same in the other direction. Another object of this invention is an improved development of the revolving means for altering the feeding speed of said rod-shaped body.

Still other objects will become incidentally apparent hereinafter to those skilled in the art.

The nature and scope of the invention are briefly outlined in the appended claims and will be more fully understood from the following specification taken together with the accompanying drawing in which Fig. 1 shows diagrammatically, in a small scale, an electric arc lamp for search lights, projecting apparatus and kindred appliances with a feeding mechanism for a rod-shaped electrode according to this invention.

Fig. 2 shows in a side elevation partly in section of a feeding apparatus fitted with a rod-shaped electrode designed according to this invention.

Fig. 3 is a cross-section taken through the feeding mechanism shown in Fig. 1 on lines III—III respectively.

Fig. 4 is an enlarged side elevation of one of the toothed wheels and the overrunning clutch connecting it to its driving trunnion.

In the embodiment of the invention shown in Figs. 1–3, numeral 1 indicates a rod-shaped electrode of an electric arc lamp, partly enclosed by a sleeve 2 rotatably mounted in a support 3. A spur-gear 4 is fitted with two slotted cheek-plates 5, 5′, mounted at opposite sides of said rod-shaped electrode 1 and the rotary sleeve 2. A gripping roller 6 having sharp circumferential edges engages the upper side of the electrode 1 and two toothed wheels 7, 7′ engage the under side of said electrode. Longitudinal slots are provided in said sleeve, through which said roller and toothed wheels project to engage the electrode 1. The trunnions of said gripping roller and the toothed wheels are journalled in the slotted cheek plates 5, 5′ attached to spur wheel 4 and are resiliently interconnected by springs 14, 14′.

The trunnion 12 of the toothed wheels 7, 7′ is attached to the bridle-formed lever 8 fitted with a roller or a ball 9 being adapted to roll over a cam or projecting lug 10.

In the embodiment of the invention shown in Fig. 4 the feeding wheel 7 is toothed like a milling cutter, each tooth, 11 tangentially directed with regard to a small circle concentric to the wheel and a face radial to the wheel axis. The trunnion 12 is fitted with grooves developed unsymmetrically. Clamping pieces or rollers 13 are positioned in said grooves forming an overrunning clutch which couples the toothed wheel with said trunnion in one direction of rotation and releases the same in the other direction.

During rotation of the gear wheel 4 and the sleeve 2 the rod-shaped electrode 1 is clutched by the gripping roller 6 and the toothed wheels 7, 7′ revolving the same; the bridle-formed lever 8 is moved to and fro by the cam 10, coupling step by step the trunnion 12 with the toothed wheels 7, 7′ and so feeding step by step the rod-shaped electrode 1 in an axial direction.

Various changes and modifications may be conveniently made in the design and structural details of feeding apparatus of the improved type described above, without substantially departing from the spirit and the salient ideas of my invention.

Having described my invention, what I claim and desire to secure by Letters Patent, is:

1. In apparatus for axial feeding of a rod-shaped body, such as an electrode of an electric arc lamp, a toothed wheel rotatably supported and so positioned relative to the said body that the teeth of the wheel successively engage the body to move the same axially as said wheel is rotated, the said teeth being of pointed profile and having a leading surface and a following surface, the elements of said leading surface lying in planes that make acute angles with the elements of the following surface, said planes being approximately radial with respect to the axis of the wheel.

2. In apparatus for axial feeding of a rod-shaped body such as an electrode of an electric arc lamp, a toothed wheel so positioned relative to said body that the teeth of the wheel successively engage said body to move the same axially as said wheel is rotated, a shaft for said wheel supported by the apparatus and connected to said wheel by an overrunning clutch, and means for periodically oscillating said shaft to rotate said toothed wheel.

3. In apparatus for axial feeding of an electrode of an arc lamp, a toothed wheel so positioned relative to said electrode that the teeth of the wheel successively engage said electrode to move the same axially as said wheel is rotated, a shaft for said wheel mounted in said apparatus for movement around the axis of said electrode, the axis of said shaft being substantially transverse to the axis of the electrode, an overrunning clutch between said shaft and said toothed wheel, and means including a lever for oscillating said shaft during the rotation of the electrode.

4. In apparatus for axial feeding of an electrode of an arc lamp, an electrode, a rotary sleeve journalled in said apparatus and enclosing a portion of said electrode, means for rotating said sleeve, a toothed wheel so positioned relative to said electrode that the teeth of the wheel successively engage said electrode to move the same axially as said wheel is rotated, a trunnion for said toothed wheel supported by said sleeve and said rotating means, an overrunning clutch connecting said wheel to said trunnion, and means including a cam for rotating said trunnion through a relatively small angle during each revolution of said sleeve.

FELIX WERNER.